United States Patent [19]

Jones et al.

[11] Patent Number: 4,512,938
[45] Date of Patent: Apr. 23, 1985

[54] UNDULATING HEAT EXCHANGE PACKING

[75] Inventors: Bryan E. Jones, Feltham; Anthony M. Kunesch, Great Bookham, both of England

[73] Assignee: Film Cooling Towers Limited, Richmond, England

[21] Appl. No.: 398,149

[22] Filed: Jul. 14, 1982

[30] Foreign Application Priority Data

Jul. 16, 1981 [GB] United Kingdom ............... 8121868
Jul. 16, 1981 [GB] United Kingdom ............... 8121913

[51] Int. Cl.³ .............................................. B01F 3/04
[52] U.S. Cl. ........................... 261/112; 261/DIG. 11; 428/182
[58] Field of Search ............ 261/112, DIG. 11, 79 A; 428/116, 182; 165/60, 166, DIG. 1

[56] References Cited

U.S. PATENT DOCUMENTS

| | | | |
|---|---|---|---|
| 389,624 | 9/1888 | Wilson | 261/112 |
| 3,475,012 | 10/1969 | Britton et al. | 261/112 |
| 3,574,032 | 4/1971 | Norback et al. | 261/112 X |
| 3,862,280 | 1/1975 | Polovina | 261/112 |
| 3,952,077 | 4/1976 | Wigley | 261/79 A X |
| 3,963,810 | 6/1976 | Holmberg et al. | 261/112 |
| 4,296,050 | 10/1981 | Meier | 261/112 |
| 4,344,899 | 8/1982 | Monjoie | 261/112 |
| 4,385,012 | 5/1983 | Priestley | 261/112 |

Primary Examiner—Richard L. Chiesa
Attorney, Agent, or Firm—Sughrue, Mion, Zinn, Macpeak and Seas

[57] ABSTRACT

A packing sheet for a heat exchange packing has an undulating shape composed of a first substantially transversely extending sine wave superimposed with a second substantially longitudinally extending sine wave. A plurality of substantially longitudinally extending recesses and a plurality of substantially transversely extending recesses each having an undulating surface are thereby defined.

A plurality of the packing sheets may be disposed in vertical parallel relationship with alternate sheets reversed to form a heat exchange packing in which the facing recesses define substantially vertically extending channels and the facing recesses define substantially transversely extending channels. The channels present a low pressure drop to liquid to be cooled and to a cooling gas and yet provide tortuous paths for the liquid and gas. Thus, the packing is able to provide efficient heat exchange and yet have a low power requirement.

6 Claims, 13 Drawing Figures

FIG. 6.
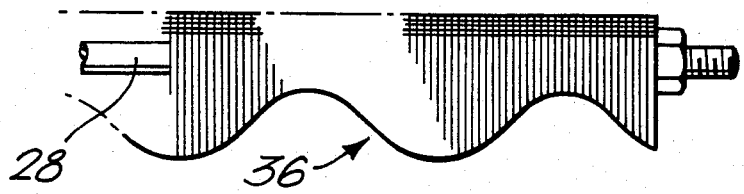
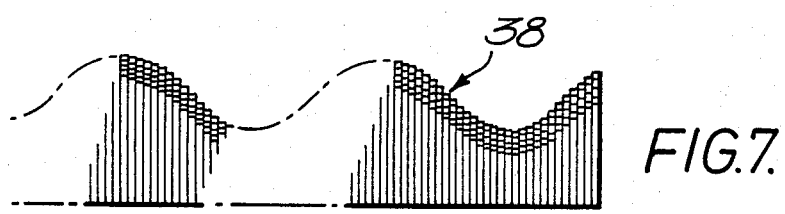
FIG. 7.
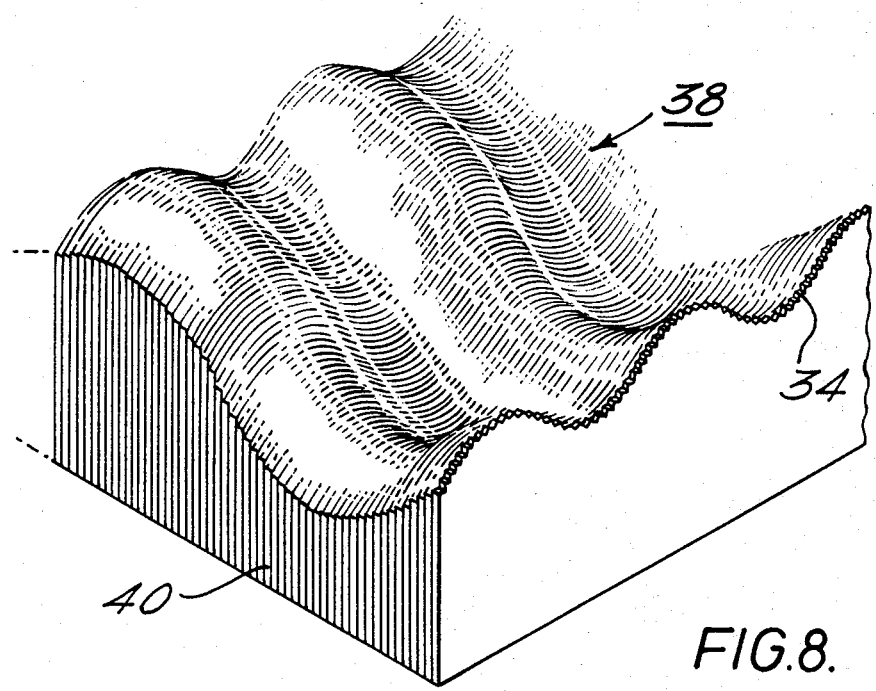
FIG. 8.

UNDULATING HEAT EXCHANGE PACKING

FIELD OF THE INVENTION

The present invention relates to a heat exchange packing, for example, for cooling towers, and to a packing sheet for use in such a packing.

It is known to provide a packing for a cooling tower comprising a plurality of corrugated sheets disposed in vertical parallel relationship, the corrugations forming channels in which a liquid to be cooled is brought into contact with a gas.

The corrugated sheets, which may be formed of plastics material, paper impregnated with resin or other suitable material, are usually produced by vacuum forming, although simple shapes can be produced by deforming a sheet of material using rollers.

There is a need to produce packings which have an increased heat exchange efficiency whilst presenting a low pressure drop.

SUMMARY OF THE PRESENT INVENTION

According to the present invention a packing sheet for a heat exchange packing has an undulating shape composed of at least two waveforms extending at an angle to each other such that any section through the sheet has an undulating profile.

A packing sheet of the invention has a more complex configuration than known corrugated sheets. When used in a heat exchange packing more tortuous paths for the liquid and the gas can be provided than in known packings. Accordingly, the liquid and gas can be brought into intimate contact for a longer time such that the efficiency of the heat exchange is increased. In addition, even though more tortuous paths can be provided, the pressure drop presented thereby can be kept low such that the power requirement can be kept low.

In an embodiment one of the waveforms extends substantially transversely of the sheet and the other extends substantially longitudinally thereof.

Alternatively, one of the waveforms may extend in the plane of the sheet whilst the other extends either substantially longitudinally or substantially transversely thereof.

In a preferred embodiment one or both of said waveforms is a sine wave.

In an alternative embodiment, the undulating shape is composed of three waveforms each extending at an angle relative to the other waveforms. Preferably, one of said waveforms extends substantially transversely of the sheet, a second one of said waveforms extends substantially longitudinally of the sheet, and the third one of said waveforms extends substantially within the plane of the sheet. All three waveforms may be sine waves.

The present invention also extends to a heat exchange packing comprising a plurality of packing sheets arranged adjacent to each other, at least one of said packing sheets being as defined above.

The present invention also provides a heat exchange packing comprising a plurality of packing sheets, each packing sheet having an undulating shape composed of at least two waveforms extending at an angle to each other, the packing sheets being arranged adjacent to each other such that channels are defined.

Preferably, said packing sheets are arranged substantially vertically in parallel relationship.

In an embodiment, each of said packing sheets has a first waveform extending substantially transversely and a second waveform extending substantially longitudinally thereof, and the packing sheets are arranged adjacent to each other with alternate sheets reversed whereby a plurality of substantially transversely extending channels and a plurality of substantially longitudinally extending channels are defined within the packing.

In a further embodiment, each of said packing sheets has a third waveform extending substantially within the plane of sheet, each of said first, second and third waveforms being sine waves and being arranged such that said substantially longitudinally extending channels extend substantially vertically and are each in the form of a spiral tube.

The provision of a packing having substantially vertically extending spiral tubes therein is particularly important. In use, the spiral tubes impart rotation to the liquid to be cooled and to the gas which ensures intimate contact between the liquid and the cooling gas for an extended period such that efficient heat exchange is produced. Furthermore, the spiral tubes presents a low pressure drop such that power requirements are low.

The present invention also enables the packing sheets defined above to be produced without the expense of producing the vacuum forming tool being prohibitive.

The present invention extends in a method of forming a packing sheet for a heat exchanger packing using a matrix having the same shape as the sheet to be formed, a method of forming a matrix comprising arranging a plurality of blades together with their surfaces adjacent to form a block, giving a first surface of the block defined by edges of said blades a first predetermined profile, giving a second surface of the block defined by edges of said blades a second predetermined profile, arranging that said first and second profiles are superimposed in one surface of the block to thereby develop a matrix in said one surface, and holding the blades together to maintain the matrix so developed.

The methods of the invention enables a matrix having a complex shape to be produced quickly and inexpensively. The matrix may be used directly as a forming tool, for example, for the vacuum forming of packing sheets. Alternatively, a forming tool may be produced, for example, by moulding from the matrix.

With the present invention, the blades may be adjusted such that the configuration of the matrix developed is varied. When the required matrix has been developed the blades are fixed together to maintain the matrix.

In an embodiment, the edges of the blades defining the first surface of the block are machined to produce said first profile. Thereafter, the edges of the blades defining said second surface are machined to produce said second profile the second surface is then positioned adjacent a support surface and the edges of the blades defining said second surface are brought into contact with said support surface whereby said first and second profiles are superimposed in said first surface such that said matrix is developed in said first surface.

It will be appreciated that although the individual machining operation on each of the first and second surfaces of the block is relatively simple a matrix having a complex configuration can be developed. Preferably, the edges of the blades are cut to produce the required profiles.

Instead of producing the second profile by machining, it can be produced by positioning said second surface adjacent a support surface provided with said second profile and bringing the edges of the blades defining said second surface into contact with said second profile whereby said second profile is simultaneously developed in said first surface and superimposed with said first profile.

BRIEF DESCRIPTION OF THE DRAWINGS

Embodiments of the present invention will hereinafter be described, by way of example, with reference to the accompanying drawings, in which:

FIG. 6 shows a side elevation of the block of FIGS. 4 and 5 after the bottom surface thereof has been profiled, FIG. 7 shows the side elevation of the block with the bolts removed, FIG. 8 shows a part perspective view of a matrix defined by the top surface of the block.

DESCRIPTION OF PREFERRED EMBODIMENTS

Figure 1:
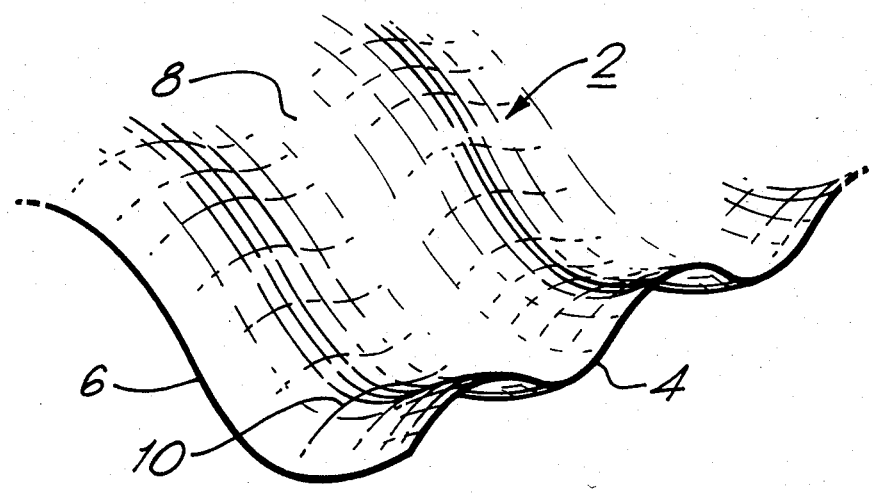
FIG. 1 shows a perspective view of part of a first embodiment of a packing sheet of the present invention.

The packing sheet 2 illustrated in FIG. 1 is arranged to be used in a packing for a cooling tower and is made of any suitable material, such as, asbestos, plastics material or resin impregnated paper. Preferably, the packing sheet is made by moulding.

The sheet 2 shown in FIG. 1 has an undulating shape composed of a first substantially transversely extending waveform 4 and a second superimposed substantially longitudinally extending waveform 6. Accordingly, any section through the sheet will present an undulating profile.

It will be seen that a plurality of substantially longitudinally extending recesses 8 each having an undulating surface are thereby defined in the sheet 2. In addition, a plurality of substantially transversely extending recesses 10 each having an undulating surface are defined in the sheet 2.

Figure 2:
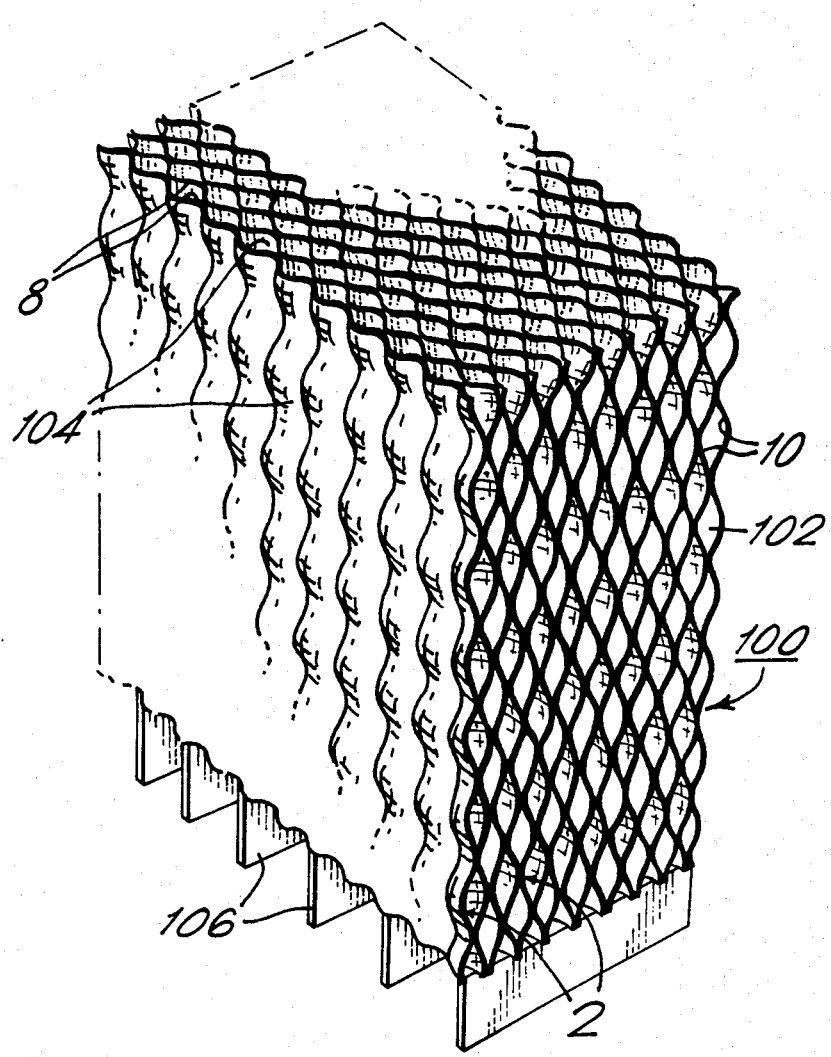
FIG. 2 shows a perspective view of a packing formed from a plurality of the sheets of FIG. 1.

A plurality of sheets 2 may be disposed adjacent to one another to form a packing 100 as shown in FIG. 2. In the embodiment illustrated, the sheets 2 are arranged to extend substantially vertically and alternate sheets are reversed such that each recess 10 of one sheet is arranged to face a respective recess 10 of the adjacent sheet. A plurality of substantially transversely extending channels 102 are thus defined by the recesses 10. Similarly, the recesses 8 define a plurality of substantially longitudinally extending channels 104. The packing 100 is supported on ribs 106 and in the embodiment illustrated selected ones of the sheets 2 are bonded to adjacent sheets by adhesive at predetermined points. Additionally and/or alternatively adjacent sheets may be held together at predetermined points by male and female locating spigots and/or in a rod assembly. The completed packing 100 can then be supported in a cooling tower (not shown) in known manner.

In use in a cooling tower, a gas, such as air, will be drawn through the substantially transverse channels 102 defined by the opposed recesses 10 and a liquid to be cooled, such as water, will be allowed to fall as a film through the substantially longitudinal channels 104 defined by the recesses 8. The air flow in this embodiment is substantially flowing across the direction of the water flow. It is also possible to cause the water flow to pass down the channels 104 with the air flow also flowing through the channels 104 in substantially concurrent or counter flow. In either case there is a tendency to impart a swirling motion to the fluids. As all of the channels 102, 104 have an undulating surface the air and water will efficiently be brought into intimate contact such that the efficiency of the heat exchange will be high even though the pressure drop presented by the packing is low. Accordingly, the packing will have a low power requirement.

In the embodiment illustrated, the sheets 2 are arranged adjacent each other to form a packing with alternate sheets reversed. Alternatively, all the sheets 2 could be disposed to face in the same direction. In this case, spacer members to space adjacent sheets would preferably be provided. Alternatively, the sheets 2 may be arranged with planar sheets interposed between each pair of sheets 2 in known manner.

The packing sheet of FIG. 1 may be manufactured by vacuum forming or moulding. In either case, it will be necessary to provide a three-dimensional matrix having the same shape as the sheet of FIG. 1 for use either directly as the forming mould or tool or as a pattern for the forming tool. FIGS. 3 to 8 illustrate successive steps in a method for producing such a three-dimensional matrix.

Figure 3:
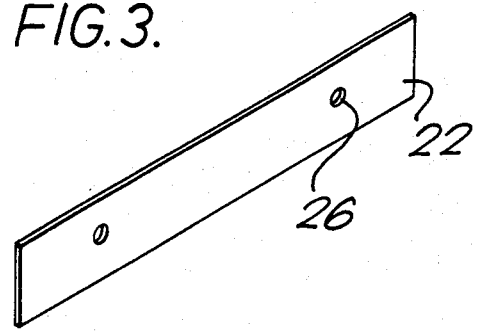
FIG. 3 shows a perspective view of a blade used in the manufacture of the packing sheet of FIG. 1.
Figure 4:
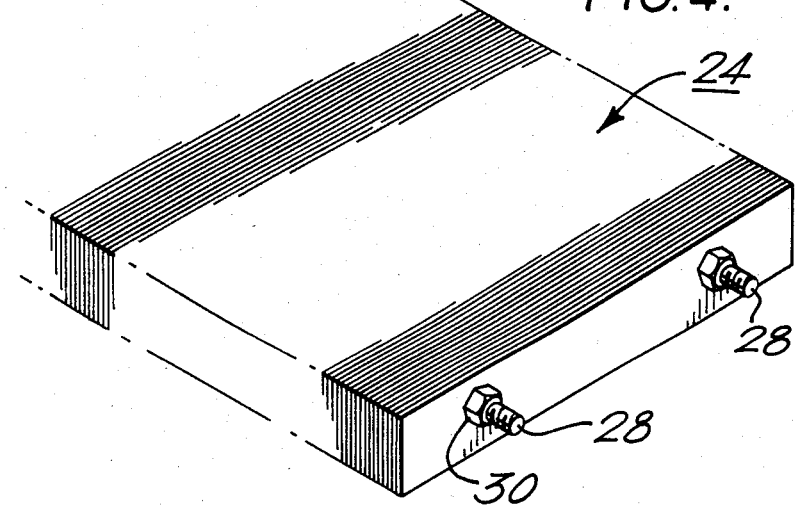
FIG. 4 shows a part perspective view of a block formed by bolting together a plurality of blades shown in FIG. 3.

FIG. 3 shows a perspective view of a rectangular planar blade 22. A plurality of these blades are arranged adjacent to one another and bolted together to form a block 24 as shown in FIG. 4. All of the blades 22 are substantially identical and each has two spaced holes 26 which are aligned to define two spaces bores extending through the block 24 in which bolts 28 are received.

The blades 22 may be made of any suitable material. It is preferred that the material has sufficient rigidity to make subsequent machining of the blades relatively straight forward. Thus, the blades 22 may be made of a laminate, metal or a plastics material. If the completed matrix is to be used directly as a vacuum forming tool, the blades would preferably be made of a metal, such as aluminium, which has suitable thermal conductivity.

Each of the blades 22 has a thickness which is preferably between 1 mm and 2 mm. In a preferred embodiment, each blade was 1.3 mm thick. The considerations in choosing the thickness of the blades are discussed further below.

It will be appreciated from FIG. 4 that the blades 22 are positioned with surfaces in contact such that the edges of the blades 22 define the surfaces of the block 24. The blades 22 are held in position by tightening nuts 30 on the bolts 28 such that the surfaces of the block 24 are substantially planar and continuous.

Figure 5:
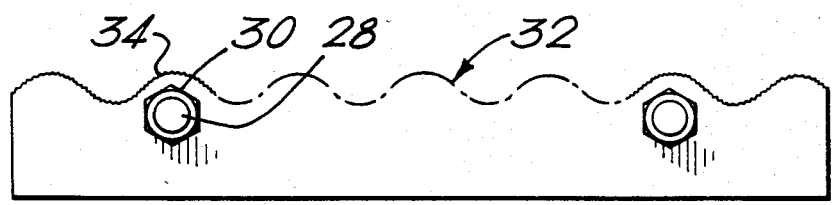
FIG. 5 shows an end elevation of the block of FIG. 4 after the top surface thereof has been profiled.

The top surface of the block 24 is then shaped. In the embodiment illustrated in FIGS. 3 to 8 the top surface is given a substantially transverse profile 32 as is shown in FIG. 5. In FIG. 5 the profile 32 is in the form of a sine wave. In the embodiment illustrated the profile is formed by machining the top surface of the block longitudinally, that is, in a direction substantially parallel to the extent of the bolts 28 and across the individual blades 22. The machining operation preferably comprises a plurality of individual longitudinal cuts such that the profile 32 is formed with a plurality of steps or serrations as indicated at 34. The top surface of the block 24 is preferably machined over substantially all its longitudinal extent such that each transverse section of the block 24 is substantially identical.

After the top surface of the block 24 has been shaped, the opposite, bottom surface of the block is shaped. As shown in FIG. 6, the bottom surface of the block 24 is given a substantially longitudinal profile 36 in the form of a sine wave. In the embodiment illustrated, the period of the sine wave of the transverse profile 32 is a multiple of the period of the sine wave of the longitudinal profile 36.

The profile 36 on the bottom surface of the block 12 is formed by machining the bottom surface transversely, that is in a direction perpendicular to the extent of the bolts 28 and parallel to the individual blades 22.

When the top and bottom surfaces of the block 24 have been profiled, the bolts 28 are removed and the block is placed with its bottom surface on a planar supporting surface (not shown). The bottom edge of each blade 22 is allowed to come into contact with the supporting surface, as is illustrated in FIGS. 7 and 8. Accordingly, the top edges of the blades 22 will take up the longitudinal profile 36 which was formed in the bottom surface. Thus, the original profiles 32 and 36 will be superimposed in the top surface of the block 24 which will thereby define a three-dimensional matrix 38. A perspective view of part of the three-dimensional matrix is shown in FIG. 8.

In order to use the matrix 38 formed by the profiled blades 22 it is only necessary to hold the blades 10 together. Thus, the blades 22 may be supported on a flat bed (not shown) and the sides and ends of the shaped block clamped into position. Additionally, and/or alternatively the profiled blades 22 may be bolted, glued or otherwise fixed together.

The matrix 38 is defined by the cut edges of the profiled blades 22 and accordingly the surface of the matrix 38 is ridged. The thickness of the blades is chosen such that the blades have sufficient strength and yet are sufficiently thin that the surface of the matrix 38 defined by the edges of the blades approaches a smooth curve. In an embodiment, the blades 22 are each approximately 1.3 mm thick.

The surface of the matrix 38 also has the steps or serrations 34 formed during the machining of the top surface of the block. These serrations 34 extend across the cut edges of the blades. It would, of course, be possible to machine the finished matrix 38 to produce a smooth surface but the surface effect produced by the ridges and serrations has been found to be advantageous when the matrix is used for the formation of packing sheets. Thus, the surface effect is reproduced on the surface of the packing sheets and is effective to encourage filming of the liquid to be cooled.

As indicated above, the matrix 38 defined by the profiled blades may be used directly as a tool for vacuum forming. Thus, the blades may be formed of a suitable metal, such as aluminium and air extract slots provided therein. Once the final shape of the matrix 38 has been developed the blades are fixed together on a flat bed and the sides and ends of the shaped block are ground or otherwise machined down to the median plane. The tool thereby produced is then used to vacuum form sheets of material into packing sheets 2 as shown in FIG. 1.

Alternatively, the matrix 38 may be made of blades of a material which cannot in the long term withstand the high temperatures of a vacuum forming operation. In this case, once the final shape of the matrix 38 has been developed the blades are fixed together on a flat bed and a release agent is put onto the surface of the matrix. A casting is then taken from the matrix. This casting may be the final vacuum forming tool or a master mould from which the tool is to be made.

In the embodiment of FIG. 1 both the first waveform 4 and the second waveform 6 are sine waves, and the period of the second waveform 6 is a multiple of that of the first waveform 4. The corresponding matrix 38 illustrated in FIG. 8 therefore has a relatively simple shape defined by two superimposed sine waves of substantially equal amplitude arranged at right angles.

Figure 9:
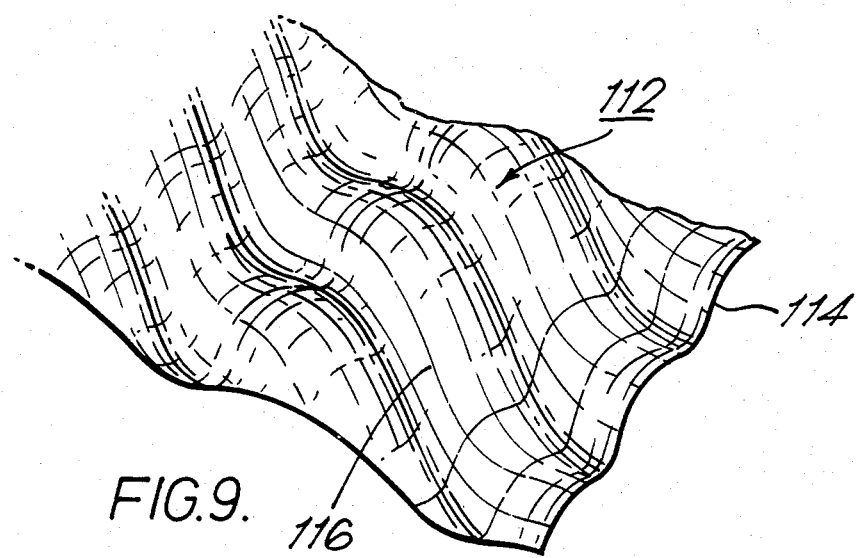
FIG. 9 shows a perspective view of part of a packing sheet of a second embodiment of the present invention.

Different shapes for the final matrix 38 and hence for the packing sheets may be developed by arranging the sine waves at an acute angle to one another as is illustrated by FIG. 9. The packing sheet 112 shown in FIG. 9 has an undulating shape composed of a first substantially transversely extending waveform 114 and a second waveform 116 which extends at an angle to the longitudinal edges of the sheet and at an acute angle to the first waveform 114. The matrix for the packing sheet 112 is formed by machining one of the surfaces of the block of blades at an angle to the longitudinal axis of the block. Additionally, and/or alternatively the other surface of the block could be machined at angle to the transverse axis thereof.

In the embodiment illustrated, the two sine waves formed in the surfaces of the block have substantially equal amplitudes and their periods are related. A differently shaped matrix and hence sheet will be produced where the amplitude of one sine wave is considerably greater than the amplitude of the other. Additionally, and/or alternatively the sine waves may have the same period or may have different and unrelated periods.

Of course, the invention is not limited to the formation of a matrix by the superimposition of two sine waves. Thus, either or both of the profiles imparted to the block 24 may have a different shape. For example, angular profiles such as a trapezoidal or sawtooth shape may be formed. These profiles may be regular or irregular.

Furthermore, the invention is not limited to the formation of a matrix by the superimposition of two profiles. Further profiles may be added, for example, instead of fixing the profiled blades of the shaped block of FIG. 8 onto a flat bed they may be fixed onto a bed having a shaped surface whereby the shape of that surface is also reflected in the shape of the matrix 38. Additionally and/or alternatively a further profile may be superimposed by positioning a profiled surface (not shown) adjacent one side 40 of the shaped block and moving the end edges of the blades 22 into contact with the profiled surface. An example of a packing sheet formed of three superimposed profiles is illustrated in FIG. 10.

Figure 10:
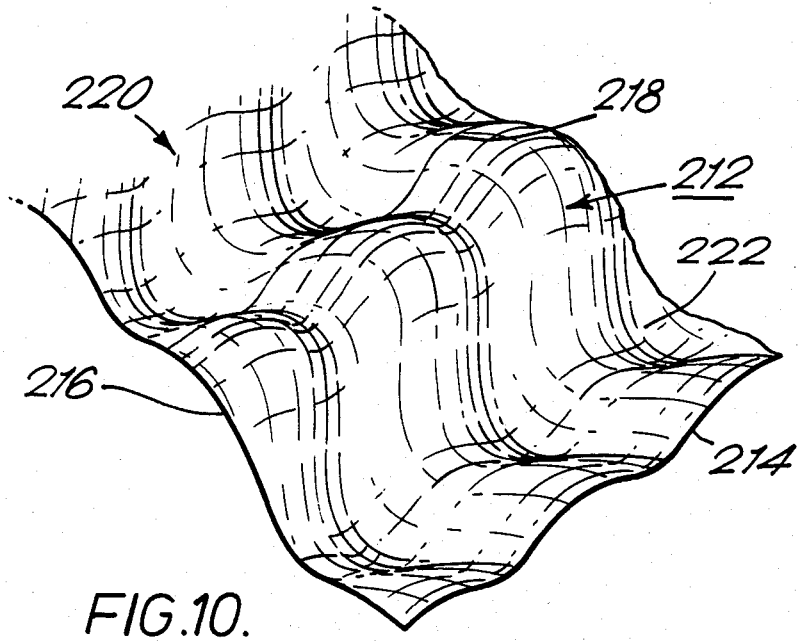
FIG. 10 shows a perspective view of part of a packing sheet of a further embodiment of the invention

The packing sheet 212 illustrated in FIG. 10 has an undulating shape composed of a first substantially transversely extending waveform 214 and a second superimposed substantially longitudinally extending waveform 216. In the embodiment illustrated each of the waveforms 214 and 216 is a sine wave. In addition, the undulating shape includes a third waveform 218, which in the illustrated embodiment is also a sine wave, which extends in the plane of the sheet. Thus, the undulating shape of the sheet 212 is composed of three superimposed waveforms 214, 216 and 218, each of the waveforms extending in a different direction. Any section through the sheet 212 will have an undulating profile.

It will be seen that a plurality of substantially longitudinally extending recesses 220 each defining half of a spiral are defined in the sheet 212. The recesses 220 also have an undulating surfaces. In addition, a plurality of substantially transversely extending recesses 222 each having an undulating surface are defined in the sheets 212.

A plurality of sheets 212 may be disposed adjacent to one another to form a packing for a cooling tower. In one embodiment the sheets 212 may be arranged to extend substantially vertically with alternate sheets reversed such that each recess 220 of one sheet faces a respective recess 220 of an adjacent sheet. The facing recesses 220 together define a channel in the form of a substantially vertically extending spiral tube. Accordingly, the packing will have a plurality of substantially vertical spiral tubes. In use, air will be drawn through the vertically extending spiral tubes and water will be allowed to fall through the spiral tubes. The spiral tubes will tend to impart a rotational movement to the water which will aid in the filming thereof and assist in bringing the water and the air into intimate contact. Of course, the pressure drop presented by the spiral tubes is low such that the packing will be efficient and yet have a low power requirement.

In an alternative embodiment, only one surface of the block 24 is profiled by a machining operation. For example, the top surface of the block 24 may be machined as described above in connection with FIG. 5. The bolts 16 are then removed from the block which is placed adjacent a surface having a chosen profile and the blades are then moved into contact therewith. For example, the matrix 38 as illustrated in FIG. 8 may alternatively be formed by placing the bottom surface of the block 24 on a support surface having a sine wave profile, the block being arranged such that the profile of the support surface extends longitudinally of the block. The bottom edges of the blades are then moved into contact with the surface of the support surface whereby the matrix 38 is defined. Additionally and/or alternatively a profiled surface may be brought into contact with the end edges of the blades at one side of the block.

It will be appreciated that the matrix 38 may also be adjusted by moving the blades relative to one another before they are clamped or otherwise fixed together. Thus, in the embodiment shown in FIG. 8 a planar surface (not shown) may be positioned adjacent the side 40 at an acute angle to the ends of the shaped block and the blades moved such that their end edges are brought into contact therewith. Further adjustments may be made until the desired final shape for the matrix 38 has been developed. The blades are then fixed together so that the matrix is maintained in its final shape.

In the embodiment illustrated in FIGS. 3 to 8 the blades 22 are planar. However, if required, one or more of the blades may have shaped surfaces. For example, the blades may be corrugated such that a corrugated stepping pattern is formed across the surface of the matrix formed.

Figure 11:
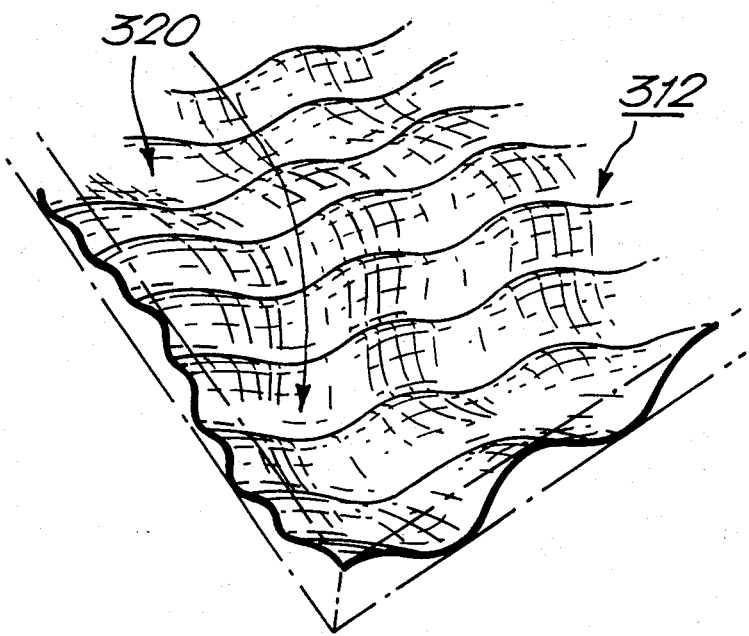
FIG. 11 shows a perspective view of part of a packing sheet of a still further embodiment of the invention.

An example of a packing sheet 312 formed using a matrix developed from corrugated blades is illustrated in FIG. 11. The packing sheet 312 has an undulating shape composed from four superimposed sine waves such that a plurality of substantially longitudinally extending recesses 320 are defined in the sheet. Each recess 320 defines half of a spiral tube which also has a spiralling surface.

A plurality of sheets 312 may be disposed adjacent to one another to form a packing for a cooling tower. If the sheets 312 are disposed vertically with alternate sheets reversed facing recesses 320 will define substantially vertically extending spiral tubes having a spiralling surface.

Figure 12:
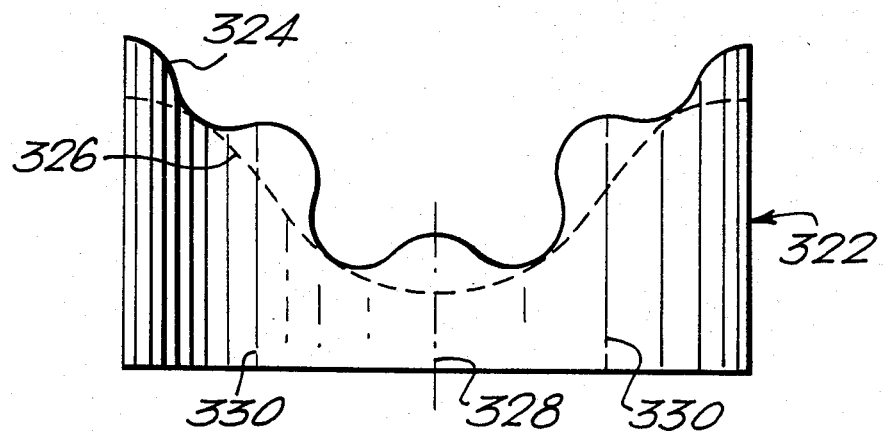
FIG. 12 shows an end elevation of a blade used in the manufacture of the packing sheet of FIG. 11.
Figure 13:
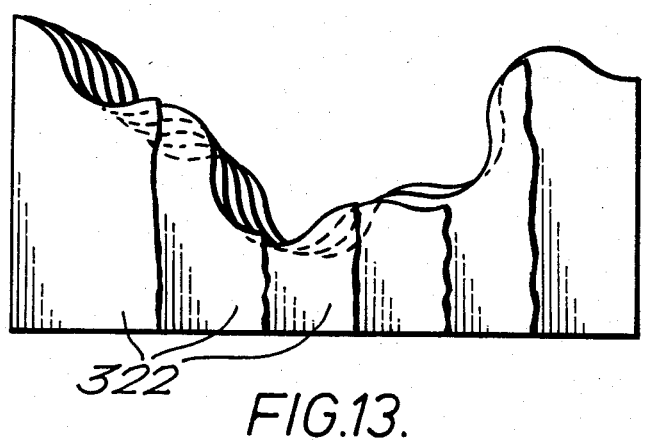
FIG. 13 shows an end elevation partially broken away of a block formed by bolting together a plurality of blades similar to that shown in FIG. 12.

A matrix for use in forming the packing sheet 312 is developed from a plurality of corrugated blades 322, one of which is illustrated in FIG. 12. Each of the blades 322 has a regular sine wave corrugation in the plane of the blade and defining peaks as indicated at 328 and valleys as indicated at 330 extending over the height of the blade 322. A respective profile 324 is machined along the top longitudinal edge of each blade 322 and then the blades are arranged adjacent to one another to form a block with a profiled top surface as indicated by FIG. 13. The profile 324 machined on each blade 322 is composed of a base sine wave indicated at 326 on which a sine wave having a smaller amplitude and period has been superimposed. The corrugations of all the blades in the block are identical and aligned and similarly the base sine waves 326 of all the blades in the block are identical and aligned. However, in the embodiment illustrated, the position of the superimposed small wave relative to the base sine wave 326 differs from blade to blade. In this respect, the blades 326 are arranged such that, as clearly shown in FIG. 13, the position of the superimposed small wave relative to the base wave in adjacent blades is sequentially incremented along the longitudinal extent of the blades. This forms in the top surface of the block waves extending across the block at an angle to the basic transverse profile defined by the base sine waves 326 of the blades 322. As previously, one the top surface of the block has been shaped, the bottom surface of the block is shaped. In this case, the bottom surface of the block is preferably given a substantially longitudinal profile in the form of a sine wave. It is preferred that this bottom profile is formed by allowing the bottom edges of the blades to come into contact with two or more knife edges extending longitudinally of the block, that is, perpendicular to the individual blades. Each knife edge has a sine wave profile along its top longitudinal edge. The longitudinal profile formed in the bottom surface of the block by bringing the bottom edges of the blades into contact with the knife edges is superimposed on the shape developed in the top surface of the block. Furthermore, moving the blades into contact with the knife edges means that the profile of the corrugations of the blades effects the final shape in the top surface of the block.

It will thus be seen that the packing sheet 312 shown in FIG. 11 is formed from four superimposed sine waves. There is the basic transverse profile defined by the base sine wave 326 and a basic longitudinal profile defined by the shape of the knife edges. In addition, the small wave is superimposed on the base sine wave 326 and the corrugations of the blades are superimposed on the wave of the knife edges.

In fact, the base sine waves 326 have been modulated by the superimposition of the small wave and it will be apparent that any of the profiles and waveforms described above may be similarly modulated if required.

We claim:

1. A heat exchange packing comprising:
   a plurality of packing sheets arranged in parallel, vertical upright, face to face relationship,
   each of said packing sheets having a first waveform extending substantially transversely and a second waveform extending substantially longitudinally thereof,
   said packing sheets being arranged adjacent to each other and being held in contact with each other at predetermined points, such that a plurality of substantially transversely extending channels and a plurality of substantially vertically extending channels are defined within the packing,
   and wherein each of said packing sheets has a third waveform extending substantially within the plane of the sheet and at angles with respect to said transversely and longitudinally extending first and second waveforms, respectively, such that said first, second and third waveforms define a spiral channel formed around each of said substantially vertically extending channels.

2. The packing according to claim 1, wherein alternate packing sheets are reversed, and wherein each of said first, second and third waveforms are sine waves.

3. The packing according to claim 1, wherein each spiral channel is at an inclined pitch.

4. A heat exchange packing comprising:
   a plurality of packing sheets arranged in parallel, vertically upright, face to face relationship,
   each of said packing sheets having a first waveform extending substantially transversely within said sheet and a second waveform extending substantially longitudinally thereof,
   said packing sheets being arranged adjacent to each other and being held in contact with each other at predetermined points, such that a plurality of substantially transversely extending channels and a plurality of substantially longitudinally extending channels are defined within the packing,
   and wherein each of said packing sheets is provided with a third waveform extending substantially within the plane of the sheet and at an angle to said transversely extending first waveform and said longitudinally extending second waveform, such that a spiral channel is formed around each of said substantially transversely extending channels.

5. The packing according to claim 4, wherein alternate packing sheets are reversed, and wherein each of said first, second and third waveforms are sine waves.

6. The packing according to claim 4, wherein each spiral channel is at an inclined pitch.

* * * * *